Figure 1:
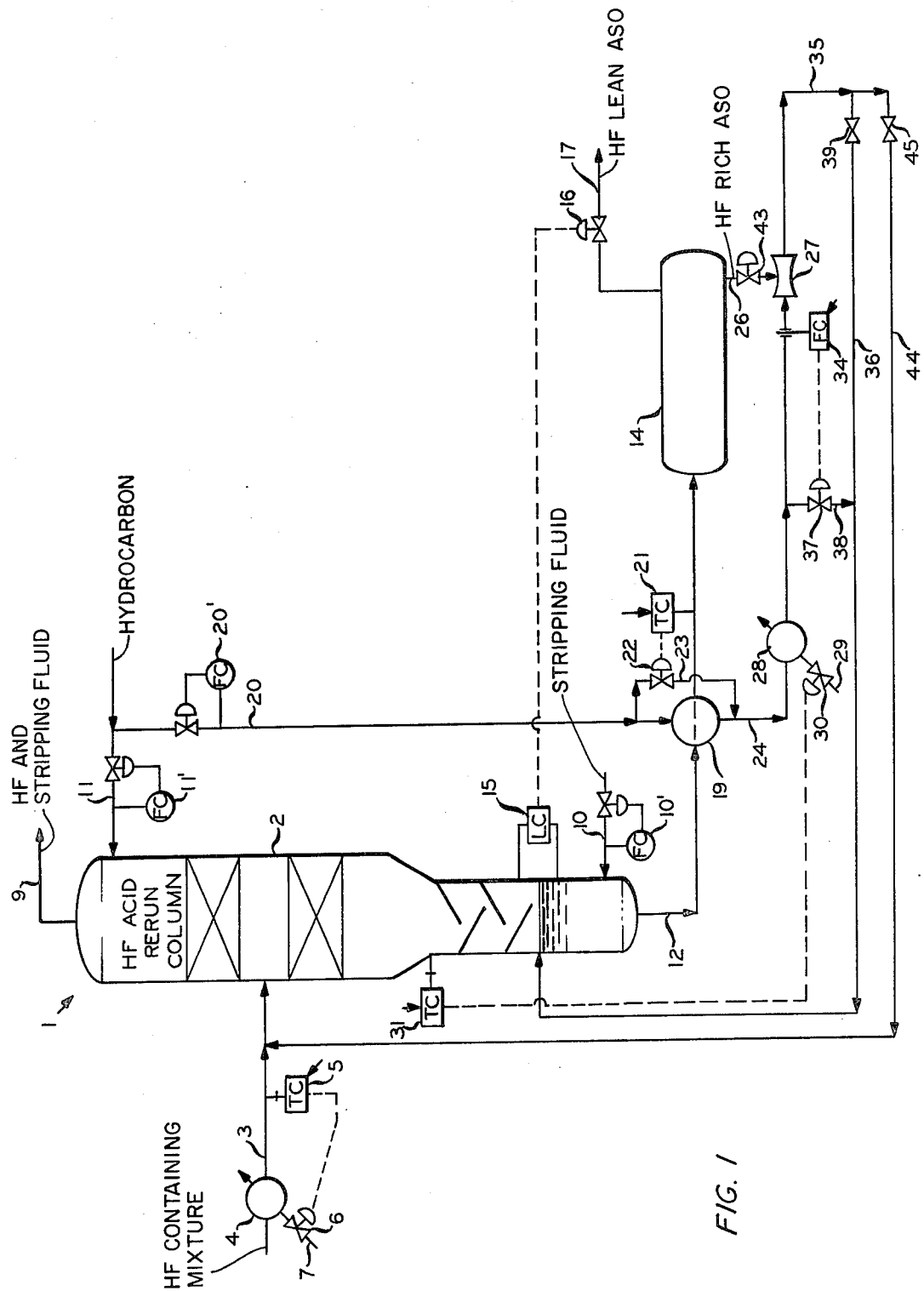

United States Patent [19]

Skraba

[11] 4,199,409

[45] Apr. 22, 1980

[54] RECOVERY OF HF FROM AN ALKYLATION UNIT ACID STREAM CONTAINING ACID SOLUBLE OIL

[75] Inventor: Frank W. Skraba, Sweeny, Tex.

[73] Assignee: Phillips Petroleum Company, Bartlesville, Okla.

[21] Appl. No.: 770,552

[22] Filed: Feb. 22, 1977

[51] Int. Cl.$^2$ .......................... B01D 3/34; C01B 7/07; C01B 7/19

[52] U.S. Cl. ...................................... 203/39; 203/70; 203/DIG. 14; 203/DIG. 25; 423/483

[58] Field of Search ................................ 423/488, 483; 260/683.48; 203/70, 57, 49, 50, 39, 68, DIG. 14, DIG. 25; 202/753

[56] References Cited

U.S. PATENT DOCUMENTS

| | | | |
|---|---|---|---|
| 2,551,881 | 5/1951 | Hachmuth | 203/82 |
| 2,574,006 | 11/1951 | Allen | 260/683.4 |
| 2,614,132 | 10/1952 | Lee et al. | 260/666 R |
| 3,551,515 | 12/1970 | Gentry | 260/683.48 |
| 3,721,720 | 3/1973 | Chapman et al. | 260/683.48 |
| 3,726,940 | 4/1973 | Cannady et al. | 260/683.48 |
| 3,793,394 | 2/1974 | Chapman | 260/683.48 |

*Primary Examiner*—Wilbur L. Bascomb, Jr.

[57] ABSTRACT

A method and apparatus for recovering HF catalyst from an alkylation unit acid stream containing acid soluble oil wherein a bottoms stream, which contains HF, acid soluble oils and a minor quantity of water, from an HF rerun column are processed. The bottoms mixture is cooled in a heat exchanger to a temperature sufficiently low so as to effect separation of HF from the acid soluble oil with the mixture then being passed to a separating vessel to allow the separation of the HF from the acid soluble oil due to the reduced mutual solubility. A gradient of HF concentration is effected within the separation vessel wherein an HF-rich acid soluble oil mixture is withdrawn as a stream separate from a substantially HF-free acid soluble oil portion which is also recovered as a separate stream.

7 Claims, 1 Drawing Figure

RECOVERY OF HF FROM AN ALKYLATION UNIT ACID STREAM CONTAINING ACID SOLUBLE OIL

It is common practice in the petroleum industry to produce high octane motor fuel by alkylating isoparaffins with olefins in the presence of a catalyst which preferably is hydrofluoric acid or hydrogen fluoride (HF). The effluent from the alkylation reactor is usually passed to a settling vessel wherein a hydrocarbon phase is separated from an HF acid phase. The hydrocarbon phase is fractionated to separate low boiling hydrocarbons from the alkylate product. The acid phase is cooled and recycled to the alkylation reactor for use in the alkylation process. However, it is necessary to purify a portion of the recycled acid phase in order to prevent a buildup of acid soluble oils (hereinafter referred to as ASO) and water in the system. Generally, this purification is accomplished by passing an HF-containing stream from the settler to an HF purification or rerun fractionation column wherein HF is stripped from the ASO by means of a vaporous hydrocarbon which is preferably isobutane. While the HF purification systems employed heretofore have generally been effective to produce an acid stream having the required purity, the recovered ASO stream from the purification unit usually has contained undesirable amounts of HF resulting in the loss of valuable HF and in ecology problems. This has required subsequent purification steps to remove HF before the ASO can be processed further such as by recycling to the refinery as fuel, or passed to a disposal unit. Typical alkylation processes are shown in U.S. Pat. No. 2,574,006, issued to Allen and U.S. Pat. No. 3,726,940, issued to Cannady et al.

The principal objects and advantages of the present invention are: to provide a method and apparatus for recovering HF from an alkylation acid stream which will result in a minimum of HF loss in recovered acid soluble oil; to provide such a method which minimizes the need for complete separation of HF from ASO in the rerun tower bottoms yield and still provide recovered ASO that contains a minimum of HF in solution therewith; to provide such an apparatus and method which provides for economical cooling of the bottoms from the rerun column wherein there is not required the use of a separate cooling system; to provide such an apparatus and method which recirculates a mixture of recovered ASO and HF to the HF rerun column for further processing; and to provide such a method and apparatus which is well adapted for its intended use and effective in operation.

Other objects and advantages of the present invention will become apparent from the following description taken in connection with the accompanying drawings wherein are set forth by way of illustration and example certain embodiments of the present invention.

FIG. 1 is a schematic representation of an apparatus used to recover HF from an alkylation acid stream.

Referring more in detail to the drawing:

The reference numeral 1 designates generally an apparatus used to recover HF from an alkylation HF acid catalyst stream. The apparatus 1 includes what is commonly referred to as a rerun fractionation or contacting column 2 which has a construction well known in the art and therefore need not be further described herein. A line 3 connects the rerun column 2 to portions of an alkylation unit (not shown) which has a construction and operation that is also well known in the art. The line 3 is operable to conduct an alkylation HF catalyst stream to the rerun column 2. Typically, the alkylation HF catalyst stream contains HF, ASO, water and isobutane. It should be noted that there is a very low water content contained in the stream and generally runs about 3 weight percent or less and the low water content is due to drying of the olefin and isobutane feedstocks. Preferably an indirect heat exchanger 4 is connected in the line 3 and is operable for controlling the temperature, by means of a suitable temperature controller 5, of the impure acid stream supplied to the rerun column 2. The temperature controller 5 is operably connected to the line 3 and a valve 6 whereby the temperature controller senses the temperature of the HF acid catalyst stream in the line 3 and controls the valve 6 in response to the temperature. The valve 6 is operable to control the amount of heat exchange medium supplied to the heat exchanger 4 via the lines 7 which is connected to a suitable source of heat exchange medium. Preferably the line 3 is connected to rerun column 2 adjacent an upper portion thereof, and used HF catalyst is added as substantially all vapor feed.

A conduit 9 communicates with an upper portion of the rerun column 2 and is provided as an overhead outlet for vaporous HF and a stripping hydrocarbon and reflux hydrocarbon such as isobutane which is introduced into the rerun column 2. The conduit 9 returns the overhead products from the rerun column 2 to the alkylation unit. Preferably, the stripping hydrocarbon is introduced into the rerun column 2 at a plurality of points to effect optimum separation of HF from the HF acid stream mixture supplied to the rerun column 2. The mixture or HF acid stream contains among other things HF, acid soluble oil and water, as described above. As shown, vaporous stripping hydrocarbon is introduced into a lower portion of the rerun column 2 through a line 10 which communicates with a lower portion of the rerun column 2. Preferably, the line 10 communicates with the rerun column 2 at a position below the level of accumulated liquid bottoms retained in a lower portion of the rerun column. Preferably the stripping hydrocarbon is introduced at a temperature of approximately 400° F. to 450° F. The bottoms herein referred to are collected portions of the mixture which has a major portion of the HF removed therefrom by contact with the stripping hydrocarbon wherein the stripping hydrocarbon and HF are taken off through the overhead conduit 9. Preferably, reflux liquid hydrocarbon, such as isobutane, is introduced into an upper portion of the rerun column 2 through a conduit 11. The conduit 11 communicates with an upper portion of the rerun column and since the reflux hydrocarbon is liquid and at a lower temperature than the mixture of gases and vaporized bottoms and vaporized mixture introduced into the column 2 through the line 3, there is effected condensation of heavier or higher boiling portions of the vaporized materials. The above-described operation is well known in the art and thereby need not be more specifically disclosed herein.

Bottoms are removed from the lower portion of the rerun column 2, preferably through a line 12 which connects the bottom portion of the rerun column 2 to a settler vessel 14, which is of generally standard construction. Preferably, means are provided to control the level of the bottoms in the rerun column 2 and, as shown, a level controller 15 is operably associated with the rerun column 2 and is also operably connected to a valve 16. The valve 16 is connected to a discharge line 17 which in turn communicates with an upper portion of the settler 14 whereby a change in the level of the bottoms is sensed by the level controller 15, which controls the valve 16 so that when the level of the bottoms becomes excessive, the valve 16 will open further and allow discharge of a portion of the contents of the settler and thereby lower or maintain the desired level of bottoms in the rerun column 2. The bottoms removed from the rerun column 2 are at a temperature of approximately 300° F. to 400° F. and the higher the temperature of the bottoms the more the mutual solubilities of the constituents of the bottoms, e.g., the higher the temperature the more ASO that will be dissolved in the HF, and the more HF that will be dissolved in the ASO.

It is to be noted that occasionally light acid soluble oils are made in HF alkylation. When this occurs the rerun bottoms temperature is lowered to become approximately 275° F. to 300° F. This allows the light ASO to go out with the rest of the bottoms rather than as an overhead product through the conduit 9. When the light ASO is no longer present, the bottoms temperature can be raised to the normal temperature as described above. This portion of the process is well known in the art.

Indirect heat exchange means 19 is connected in the line 12 between the rerun column 2 and the settler 14 and is operable to cool the bottoms as same are being conducted from the rerun column 2 to the settler 14. The heat exchange means 19 is connected to a suitable source of cooling medium to provide indirect cooling for the bottoms. Preferably, and as shown, the heat exchange means 19 is connected to the line 11 by a line 20 whereby cooled liquid hydrocarbon from the line 11 is conducted to the heat exchange means 19 to effect the cooling of the discharge bottoms. As shown, flow controllers 10', 11' and 20' are provided in lines 10, 11 and 20, respectively, for regulation of flow therethrough. Preferably, temperature control means is provided to control the temperature of the bottoms entering the settler 14. As shown, a temperature controller 21 is operably connected to the line 12 to sense the temperature of the fluid therein and is also operably connected to the flow control valve 22 which is connected in a by-pass line 23. The by-pass line 23 is connected between the line 20 and a discharge line 24 to form a bypass around the heat exchange means 19 whereby a change in temperature is sensed by the temperature controller 21 to thereby control the valve 22 as, for example, when the bottoms entering the settler 14 are too hot, the valve 22 will be further closed in response to operation of the temperature controller 21 to allow more cooling medium to flow through the heat exchanger 19 to cool the bottoms to the desired temperature. Preferably, the bottoms entering the settler 14 are maintained at a temperature of up to approximately 125° F. and, preferably, in the range of 75° F. to 125° F. and more preferably, in a temperature range of 90° F. to 115° F. The liquid hydrocarbon which is used as a cooling medium is heated in the heat exchange process conducted in the heat exchange means 19 and leaves the heat exchange means 19 in a heated condition as, for example, at a temperature in the range of about 130° to 175° F., and preferably, about 145° F. However, it is to be noted that this condition may be varied in the process.

The material in settler 14 consists of a continuous ASO phase in which is dispersed small droplets of HF. Most of the HF droplets, in time, will settle near the bottom of the settler. Thus by withdrawing material from the bottom of the settler, there is obtained an HF-rich ASO phase portion and from the top, there is obtained an HF-lean ASO portion.

A line 26 communicates with a lower portion of the settler 14 and is operable for discharge of an HF-rich ASO phase. The ASO phase withdrawn from the top of the settler 14 through the line 17 is in a substantially HF-free condition. The recovered heavy phase from the settler 14 preferably is returned to the rerun column 2 for recycling and reuse as is desired. To accomplish this, a preferred means is to provide an eductor 27 which has the line 26 communicating therewith and the educting fluid preferably is the vaporized hydrocarbon discharged through the line 24 which is connected in flow communication with the eductor 27 whereby the stripping hydrocarbon is used to educt the heavier phase from the settler 14 back to the rerun column 2. However, it is to be understood that other methods of recycling the heavier phase containing the HF, which is discharged through the line 26, can be provided. In the form shown, the line 24 has an indirect heat exchanger 28 connected thereto. The heat exchanger 28 is connected to a suitable source (not shown) of heat exchange medium by a line 29 which has a control valve 30 connected thereto. Preferably, the valve 30 is operably connected to a temperature controller 31 which in turn is operably associated with the rerun column 2 to sense the temperature therein. The vaporous hydrocarbon from the line 24, downstream of the heat exchanger 28, is introduced into the rerun column 2 in a manner later described with the temperature of the hydrocarbon being controlled to maintain a predetermined temperature in the rerun column 2 by use of the heat exchanger 28 and control means associated therewith.

Preferably, a flow controller 34 is operably connected to the line 24 to sense the flow of the vaporous hydrocarbon therethrough. A line 35 communicates with the eductor 27 and in turn is connected to a line 36 which communicates with the rerun column 2 whereby vaporous hydrocarbon and educted heavy phase from the settler 14 is returned to the rerun column 2. The flow controller 34 is operably connected to a flow control valve 37 which in turn is connected in a by-pass line 38 which communicates between the line 24 and the line 36 to form a flow control by-pass. The flow of vaporous hydrocarbons through the eductor 27 is controlled by the flow controller 34 which in turn controls the amount of by-pass stripping hydrocarbon flowing through the line 38 to bypass the eductor 27. Preferably, a valve 39 is connected in the line 36 between the eductor and the connection of the line 36 with the line 38 to control the amount of educting fluid and educted heavier phase flowing back to a preselected locus in the rerun column 2. This can be either a manually controlled valve or can also be an automatically controlled valve. It is to be noted that the educted heavier phase is heated by the educting fluid so that the mixture of same is in a heated condition in a preferred embodiment, before introduction into the rerun column 2.

The present invention is more fully understood by a description of the operation thereof. The alkylation HF acid stream from an alkylation unit which is to be rerun is introduced into the rerun column 2 through the line 3 with the temperature of same being controlled by the use of the heat exchanger 4 and a temperature controller combination 5. The acid waste stream is contacted by stripping vaporous hydrocarbon which is introduced through the line 10 whereby a major portion of the HF contained in the acid waste stream is removed as a vaporous overhead product through the line 9 along with the stripping hydrocarbon and now vaporized reflux hydrocarbon which is introduced through the line 11. Liquid reflux hydrocarbon preferably is introduced into an upper portion of the rerun column to contact any vaporous heavier materials and to condense same so that the condensed materials will collect in the bottom of the rerun column. The level controller 15 is operable to control the level of the bottoms in the bottom of the rerun column 2 by allowing discharge of ASO which is substantially free of HF through the lines 17 from the settler 14. Preferably, the amount of ASO discharged through the lines 17 will be about 25 volume percent or less of the amount of the material added via conduit 12. The collected bottoms are conducted from the rerun column 2 to the settler 14 via line 12 and before introduction into the settler 14 the bottoms are cooled to a temperature of up to approximately 125° F. as described above. Upon entering the settler the cooled bottoms remain a sufficient length of time to allow the ASO and the HF to sufficiently separate and because of the difference in densities, the HF will concentrate in the lower portion of the settler 14 for discharge as an HF-rich oil phase through the line 26. This separation is due to the reduced mutual solubilities because of the lowering of the temperature of the bottoms entering the settler 14. The ASO discharged through the lines 17 will be substantially free of HF, having about 1 percent by weight and preferably less than about 0.5% and most preferably less than about 0.1%. A small amount of water will also be discharged through the line 26 with the HF-rich ASO phase. This water will be in the amount of approximately 0.5 percent or less and can be considered a trace material. Up to about 90 percent of the ASO-containing HF entering the settler 14 can be recycled back to the rerun column by being discharged with the second or heavy phase containing the HF and water through the line 26. It is to be understood that anywhere from 0 to about 90 percent of the ASO entering the rerun column 2 can be recycled and preferably about 75 to 90 percent of the ASO is recycled to the rerun column 2. This importantly eliminates the need for complete phase separation of the ASO and HF (and water). However, it is to be noted that complete phase separation could be accomplished in the settler 14 whereby little or no ASO would be discharged through the second phase discharge 26. However, this would require prohibitively long separation times and a prohibitively large settler vessel 14.

A line 44 can be connected to the line 35 and the line 3 so that a portion of the recovered second phase can be returned to an upper portion of the rerun column 2 with the line 44 preferably having a flow control valve 45 connected thereto to control the amount of materials flowing through the line 44. Since this is an alternate embodiment of the above-described invention, it is to be understood that the line 44 and valve 45 can be eliminated, if desired. The ASO recovered through the line 17 is conducted to other apparatus (not shown) for further processing of the ASO. The second phase recovered through the line 26 is educted and recycled back to the rerun column for use in the HF stripping operation. It is seen, therefore, that a portion of the ASO is continually recycled to the rerun column 2 and is heated before recycling to the rerun column 2 to further enhance the operating efficiency of the column 2.

A calculated example is provided to illustrate operability of the above-described apparatus is shown below:

| Feed to HF Rerun Column (line 3): | | |
|---|---|---|
| Barrels/hr.[a], | 50 | (7.95 m$^3$/hr.) |
| Temperature, °F., | 290 | (143.3° C.) |
| Composition, Wt. %: | | |
| HF | 90 | |
| H$_2$O | 1.5 | |
| Acid Soluble Oils (ASO) | 7.5 | |
| Isobutane | 1 | |
| HF Rerun Overhead Yield (line 9): | | |
| Barrels/hr., (is vapor yield)[a], | 104.5 | (16.62 m$^3$/hr.) |
| Temperature, °F., | 265 | (129.4° C.) |
| Composition, Wt. %: | | |
| HF | 55.8 | |
| H$_2$O | 0.9 | |
| Isobutane | 40.3 | |
| Other | 3 | |
| HF Rerun Reflux (line 11): | | |
| Barrels/hr., | 5 | (0.795 m$^3$/hr.) |
| Temperature, °F., | 100 | (37.8° C.) |
| Vaporous iC$_4$ Stripping Fluid (line 10): | | |
| Barrels/hr., (is vapor)[a], | 1 | (0.159 m$^3$/hr.) |
| Temperature, °F., | 435 | (223.9° C.) |
| Isobutane to Heat Exchange Zone (line 20): | | |
| Barrels/hr., | 50 | (7.95 m$^3$/hr.) |
| Isobutane Vapor to Eductor (line 24)*: | | |
| Barrels/hr., | 20 | (3.18 m$^3$/hr.) |
| Temperature, °F., | 435 | (223.9° C.) |
| *(Line 37 flow, barrels/hr., | 30 | 4.77 m$^3$/hr.) |
| HF Rerun/Bottoms (line 12): | | |
| Barrels/hr., | 6.9 | (1.10 m$^3$/hr.) |
| Temperature, °F., | 360 | (182.2° C.) |
| Composition, Wt. % | | |
| HF | 11.4 | |

| -continued | | |
|---|---|---|
| H₂O | 0.3 | |
| ASO$^{(b)}$ | 86.4 | |
| Isobutane | 1.9 | |
| ASO Yield from Settler (line 17): | | |
| Barrels/hr., | 1.5 | (0.24 m³/hr.) |
| Temperature, °F., | 110 | (43.3° C.) |
| Composition, Wt. %: | | |
| HF | 0.1 | |
| H₂O | 0.4 | |
| ASO$^{(b)}$ | 97.8 | |
| Isobutane | 1.7 | |
| Recycle from Settler (Absent Eductor IC₄) (line 26): | | |
| Barrels/hr., | 5.4 | (0.86 m³/hr.) |
| Temperature, °F., | 110 | (43.3° C.) |
| Composition, Wt. %: | | |
| HF | 14.6 | |
| H₂O | 0.3 | |
| ASO$^{(b)}$ | 83.2 | |
| Isobutane | 1.9 | |
| Operating Conditions | | |
| HF Rerun Column (line 2): | | |
| Top Temperature, °F., | 265 | (129.4° C.) |
| Bottom Temperature, °F., | 360 | (182.2° C.) |
| Top Pressure, psia, | 135 | (931.5 kPa a.) |
| Bottom Pressure, psia | 135 | (931.5 kPa a.) |
| Settler (14): | | |
| Temperature, °F., | 110 | (43.3° C.) |
| Pressure, psia, | 135 | (931.5 kPa a.) |

$^{(a)}$is a vapor stream.
$^{(b)}$85° F. to 600° F. approximate boiling range (29.4° C.-315.6° C.)

The system of the above example (recovers) rejects from the unit about 1½ barrels/hour (0.24 m³/hr.) of acid soluble oil, and recovers about 1500 pounds/day (681 Kgm/day) of HF by not letting it discharge from line 17, but returns it to the system via line 26.

What is claimed and desired to be secured by Letters Patent is:

1. A method of recovering hydrofluoric acid, said method comprising:
   stripping a mixture containing at least HF, water, and acid soluble oil by contacting the mixture with a vaporous hydrocarbon in a fractionation column;
   recovering as an overhead product from said column a vaporous mixture of HF and vaporous hydrocarbon;
   collecting a second mixture of HF, water and acid soluble oil in a lower portion of said column;
   removing a portion of said second mixture from said column, cooling the thus removed portion of said second mixture to a temperature no higher than approximately 125° F;
   phase separating the thus cooled portion of said second mixture into a first continuous acid soluble oil phase portion containing acid soluble oil which is substantially free of HF, and a second continuous acid soluble oil phase portion containing a major portion of the HF contained in the second mixture and acid soluble oil;
   separating said second portion from said first portion; and
   returning the thus separated second portion containing HF to said column.

2. A method as set forth in claim 1 wherein:
   said portion of said second mixture is cooled by indirect contact with a cooling hydrocarbon; and including
   introducing at least a first portion of the cooling hydrocarbon into the column after the first portion of cooling hydrocarbon has been used for cooling of said portion of the second mixture.

3. A method as set forth in claim 2 wherein:
   a second portion of said cooling hydrocarbon is used as a working fluid to contact and return the recovered second portion of said continuous ASO phase to the column by eduction; and including
   heating said first portion of said cooling hydrocarbon before introducing said first portion of said cooling hydrocarbon into said column.

4. A method as set forth in claim 1 wherein:
   said thus separated second portion contains up to about 90 percent of the acid soluble oil contained in the cooled portion of said second mixture.

5. A method as set forth in claim 4 including:
   heating said thus separated second portion before recycling said thus separated second portion to said column.

6. A method of recovering hydrofluoric acid, said method comprising:
   stripping a mixture containing at least HF, water and acid soluble by contacting the mixture with vaporous hydrocarbon in a fractionation column;
   recovering as an overhead product from said column a first mixture of HF and vaporous hydrocarbon;
   collecting a second mixture of HF, water and acid soluble oil in a lower portion of said column;
   removing a portion of said second mixture from said column and cooling the thus removed portion of said second mixture by indirect contact with a cooling hydrocarbon to a temperature no higher than about 125° F.;
   phase separating the thus cooled portion of said second mixture into a first continuous acid soluble oil phase portion containing acid soluble oil which is substantially free of HF, and a second continuous acid soluble oil phase portion containing a major portion of the HF contained in the second mixture and acid soluble oil, with said acid soluble oil in the second phase portion being up to about 90 percent of the acid soluble oil contained in the thus cooled portion of said second mixture;

separating said first phase portion from said second phase portion;

returning the thus separated second phase portion containing HF to said column; and introducing at least a portion of the cooling hydrocarbon into said column as at least a portion of said vaporous hydrocarbon after the portion of cooling hydrocarbon has been used for cooling said portion of said second mixture.

7. A method as set forth in claim 6 wherein:

said portion of cooling hydrocarbon introduced into the column is heated before introducing said portion of cooling hydrocarbon into said column; and at least a portion of said cooling hydrocarbon is used as a working fluid to contact and return said separated second phase portion to said column by eduction.

* * * * *

UNITED STATES PATENT AND TRADEMARK OFFICE
CERTIFICATE OF CORRECTION

PATENT NO. : 4,199,409
DATED : April 22, 1980
INVENTOR(S) : Frank W. Skraba

It is certified that error appears in the above-identified patent and that said Letters Patent are hereby corrected as shown below:

Column 8, line 35, "ASO" should read --- acid soluble oil ---.

Signed and Sealed this

Thirtieth Day of September 1980

[SEAL]

Attest:

SIDNEY A. DIAMOND

Attesting Officer

Commissioner of Patents and Trademarks